United States Patent [19]
Murase

[11] Patent Number: 4,583,184
[45] Date of Patent: Apr. 15, 1986

[54] ULTRASONIC IMAGE PROCESSOR

[75] Inventor: Masakazu Murase, Fuji, Japan

[73] Assignee: Terumo Kabushiki Kaisha, Tokyo, Japan

[21] Appl. No.: 453,950

[22] Filed: Dec. 28, 1982

[30] Foreign Application Priority Data

Jan. 13, 1982 [JP] Japan .................................. 57-2786

[51] Int. Cl.$^4$ ...................... G06F 15/62; G06F 15/68
[52] U.S. Cl. .................................. 364/518; 358/112; 364/575; 364/734
[58] Field of Search ................. 128/660; 340/703, 723, 340/728, 794, 795, 796; 358/112; 364/413, 414, 415, 575, 734, 518

[56] References Cited

U.S. PATENT DOCUMENTS

| | | | |
|---|---|---|---|
| 4,204,226 | 5/1980 | Mistretta et al. | 358/111 |
| 4,222,048 | 9/1980 | Johnson | 340/723 X |
| 4,359,728 | 11/1982 | Mahony | 340/728 X |
| 4,361,043 | 11/1982 | Engle | 128/660 X |
| 4,375,671 | 3/1983 | Engle | 358/112 X |
| 4,408,228 | 10/1983 | Mahony | 358/112 X |

FOREIGN PATENT DOCUMENTS

| | | |
|---|---|---|
| 55-45422 | 3/1980 | Japan . |
| 55-145489 | 11/1980 | Japan . |
| 56-21079 | 2/1981 | Japan . |
| 1350096 | 4/1974 | United Kingdom . |
| 1540345 | 2/1979 | United Kingdom . |

OTHER PUBLICATIONS

"On the Enhancement of the SNR of Repetitive Signals by Digital Averaging", by Z. Kovacs: IEEE Transactions on Instrum., vol. 28, No. 2, Jun. 1979, pp. 152-155.
"A Programmable Digital Signal Averager", by Srinivasan et al., J. Phys. E: Sci. Instrum., vol. 13, No. 12, Dec. 1980, pp. 1263-1265.
"Data-Smoothing Digital Interface Between a High-Speed Transient Recorder and a Slow Signal Averager" by Spencer et al., Rev. Sci. Instrum. vol. 52, No. 6, Jun. 1981, pp. 940 and 941.

Primary Examiner—Gary Chin
Assistant Examiner—Edward R. Cosimano
Attorney, Agent, or Firm—Frishauf, Holtz, Goodman & Woodward

[57] ABSTRACT

By repeatedly adding items of picture element data representing an identical region of a serial picture element input which arrives serially in time, an improvement is effected in the S/N ratio of a periodic signal mixed in irregular, randomly occurring noise. A memory is provided for storing items of picture element data of one frame at storage locations corresponding to each of the picture elements. For each new item of picture element data that arrives, an item of picture element data of the same region accumulated and stored prior to said arrival is readout of the memory and added to the newly arrived data. The resulting sum is then written back into the memory at the same storage location. Thus, a single memory can be made to store picture data of enhanced S/N ratio merely by increasing slightly the bit storage capacity per data item in conformance with the number of times frames are accumulated.

4 Claims, 5 Drawing Figures

ULTRASONIC IMAGE PROCESSOR

BACKGROUND OF THE INVENTION

1. Field of the Invention

This invention relates to an ultrasonic diagnostic apparatus and, more particularly, to an ultrasonic diagnostic apparatus for displaying a static or so-called "frozen" image or picture by means of a picture signal which includes picture element data representing each of a plurality of picture elements contained in a single frame.

2. Description of the Prior Art

Ultrasonic diagnostic equipment of the above-described type is in wide use. A characteristic of a real-time ultrasonic diagnostic apparatus is that portions of the human body such as the human heart, or a fetus while still within the mother's womb, can be observed on a real-time basis. Such an apparatus capable of displaying a dynamic image of this kind is equipped with a so-called "freeze" function which allows the operator or attendant to freeze the dynamic image at will in order to obtain instantaneous bioinformation at a given point in time. A frozen image, produced by direct freezing of the dynamic image at a certain time, generally gives a picture quality that is poorer than that of the dynamic image. Ordinarily, with a standard television system, a picture is displayed on the display screen at a speed of 30 frames per second. When freezing a dynamic image of this kind, the usual method comprises temporarily storing, in memory, picture element data representing each of the picture elements contained in one frame at a given point in time, and repeatedly reading the items of data out of the memory to reconstruct them as a static picture of one frame. Accordingly, though there is some difference depending upon visual quality, the quantity of information obtained at the rate of 30 frames per second generally is greater than that obtained in the form of a frozen image from one frame of a dynamic image. With a dynamic image, therefore, visual discrimination of the boundary regions of an image such a tomograph produced in ultrasonic diagnosis is facilitated owing to movement of the boundary regions. Moreover, with a frozen image, a random noise component also is frozen into the image and has a pronounced influence on visual clarity.

Methods have been proposed for improving upon the picture quality of a frozen image obtained by freezing a dynamic image. According to one such method, picture signals obtained by scanning the same portion of the specimen a plurality of times by ultrasonic waves are stored in memories, referred to as frame memories, provided for corresponding frames. Then, for reconstruction, the stored items of data are read out of each of these memories and added together, thereby improving the signal-to-noise ratio. The ultrasonic diagnostic apparatus for realizing this method has been disclosed in Japanese Patent Application Laid-Open No. 55-45422. The apparatus is complex in construction and high in cost, however, owing to the need for a number of frame memories equivalent to the number of frames that are to take part in the addition operation.

Another proposal relates to an ultrasonic video apparatus, disclosed in Japanese Patent Application Laid-Open No. 55-145489. According to this apparatus, video from the same target area is sampled continuously for a plurality of frames, and a serial picture having a differential noise component is obtained, serially in terms of time, from a serial picture input and a serial picture output of an identical region, said serial picture output having already been made to approach a target value. The weighted average of the resulting serial picture is then integrated, whereby the serial picture output is constantly made to approach a reproducible target value to improve upon the signal-to-noise ratio. With this apparatus, a division operation is carried out to reduce the weighted average of the serial picture containing noise, with the result that several bits of lower order digits are dropped each time a division is performed. The end result is a deterioration in the accuracy with which the serial picture output can be made to approach on the target value.

Still another proposal, disclosed in Japanese Patent Application Laid-Open No. 56-21079, relates to an ultrasonic receiver apparatus for integrating picture signals by using analog elements. With analog elements, however, the number of effective digits is not as large as with digital elements, so that no improvement in picture signal accuracy can be achieved. Such apparatus is therefore suited to limited applications not adaptable to digital processing.

SUMMARY OF THE INVENTION

Accordingly, an object of the present invention is to provide an ultrasonic diagnostic apparatus devoid of the shortcomings encountered in the prior art.

Another object of the present invention is to provide an ultrasonic diagnostic apparatus in which a frozen image produced by freezing a dynamic image has enhanced picture quality.

A further object of the present invention is to provide an ultrasonic diagnostic apparatus having frozen image display means of simple construction.

According to the present invention, these and other objects are attained by providing an ultrasonic diagnostic apparatus comprising memory means for storing each item of picture element data of one frame at a storage location corresponding to each picture element, adding means for adding each item of picture element data, each time the item of picture element data of one frame arrives, to an item of picture element data stored at a storage location in the memory means that corresponds to the arrived picture element data, control means for causing the addition of picture element data, performed by the adding means, to be executed for a selected number of a series of frames, and read means for reading the items of picture element data, stored in the memory means, out of the memory means successively when the addition of picture element data, performed by the adding means, ends for the series of frames, the items of picture element data being converted into a serial picture signal for displaying a frozen image. The read means includes dividing means for producing the serial picture signal by dividing each item of of picture element data read out of the memory means by a selected number.

In an embodiment of the invention, the adding means includes data holding means such as a latch adapted, each time an item of picture element data in one frame arrives, for reading out of the memory means, and for temporarily holding, an item of picture element data stored at a storage location corresponding to the arrived item of picture element data, the item of picture element data held in the holding means being added to the arrived item of picture element data by the adding means, whereupon the control means causes the result of the addition to be stored in the memory means at the corresponding storage location. The control means includes means for setting the selected number manually.

In accordance with the present invention, one frame of a frozen image or picture is formed by adding and then taking the arithmetic mean of items of picture element data representing corresponding picture elements in each of a series of frames. Accordingly, a periodic signal buried in irregular, randomly occurring noise may be extracted, by adding and averaging, as a picture signal representing a frozen picture. Letting F (a natural number) represent the number of addition operations, namely the number of frames in the series which take part in the adding and averaging, the noise is averaged on the basis of $1/\sqrt{F}$. In other words, the signal-to-noise ratio is improved in proportion to the square root of the number of times addition is performed.

Other features and advantages of the invention will be apparent from the following description taken in conjunction with the accompanying drawings in which like reference characters designate the same or similar parts through the figures thereof.

DESCRIPTION OF THE PREFERRED EMBODIMENT

Figure 1:
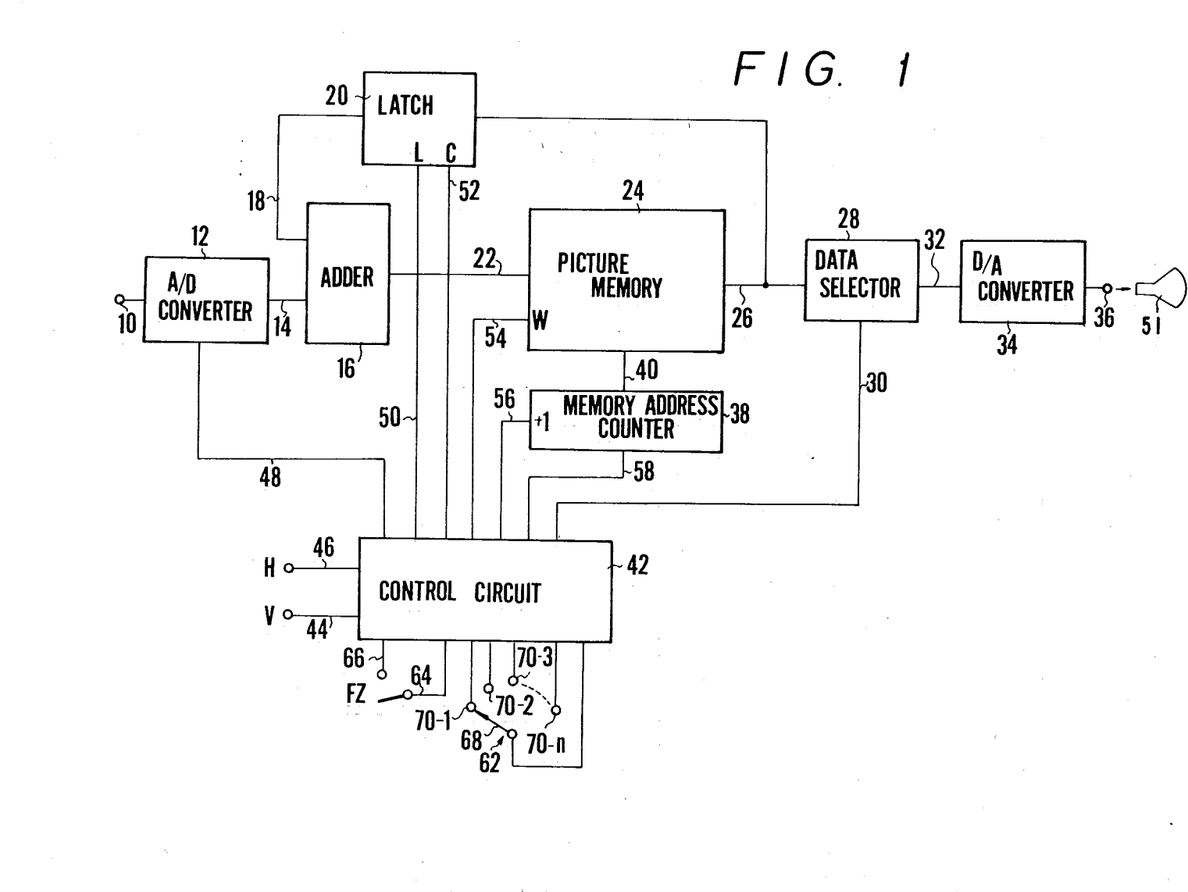
FIG. 1 is a block diagram illustrating an embodiment of an ultrasonic diagnostic apparatus according to the present invention.

Reference will first be had to FIG. 1 to describe an ultrasonic diagnostic apparatus embodying the present invention. There is provided an analog-to-digital (A/D) converter 12 having an input terminal 10 for receiving a picture signal input, namely a serial picture signal of raster scanning type, such as a television signal. The converter 12 converts this signal into an N-bit digital signal corresponding to a level of $2^N$, where N is a natural number. The converted signal, appearing as an output designated at numeral 14, is applied to one input terminal of an adder 16, the other input terminal whereof receives the output 18 (a signal of N+n bits, where n is a natural number) of a latch 20. The adder 16 adds these two input signals to produce an output signal 22 of N+n bits, representing the computed sum.

The output 22 of adder 16 is connected to the data input terminal of a picture memory 24. The latter comprises a random access memory, such as a semiconductor memory, and is capable of storing picture data, relating to each picture element of a single frame, at addresses corresponding to the respective picture elements. In the illustrated embodiment, we shall assume that one frame comprises, say, 512×114 picture elements, so that the memory 24 will have 512×114 storage locations, or addresses, of N+n bits. The N+n-bit data output 26 of the picture memory 24 is applied as an input signal to a data selector 28, and as an input to the latch 20. The latter is adapted to temporarily store, or "latch", the N+n-bit item of picture data read out of the memory 24 before applying the data to the adder 16 as the input 18. The data selector 28 is a $2^m$-dividing circuit adapted to select N bits of the picture data item 26, read out of the picture memory 24, from a position obtained by shifting the least significant bit position m bits higher (i.e., to the left) in response to a data select signal constituting a control input 30, where m is a natural number less than n. The result of the division operation, namely an N-bit signal 32, is applied to a digital-to-analog (D/A) converter 34. The latter converts the digital signal 32 into an analog signal 36 which appears at the converter output, which signal may then be applied to a display device 51.

The read/write addresses of the picture memory 24 are designated by a memory address counter 38 connected to the memory 24 by a lead 40.

The operation of the foregoing circuitry is controlled by a control circuit 42. The control circuit 42, having input terminals 44, 46 which receive the vertical (V) and horizontal (H) synchronizing signals of the picture signal applied to the input terminal 10 of the A/D converter 12, responds to these signals by producing control signals 48, 50, 52, 54, 56 and 58, as well as the abovementioned control signal 30. The circuit 42 in the illustrated embodiment is composed of control logic but may be realized by a microprocessor as well.

The control signal 48 is an A/D conversion pulse, of which 512 are applied to the A/D converter 12 in synchronism with a single horizontal synchronizing signal which arrives at the input terminal 46 of the control circuit. The reason for the 512-pulse output 48 is that, in the illustrated embodiment, each of 114 horizontal scanning lines constituting a single picture, or frame, includes 512 picture elements. In response to these A/D conversion pulses, the A/D converter 12 converts the analog picture signal on its input terminal 10 into a digital signal corresponding to the level of the analog signal, the digital signal being applied to one input of the adder 16.

The control signal 50 is composed of latching pulses connected to the terminal L of the latch 20 and produced at the same timing as the A/D conversion pulses in sync with the horizontal synchronizing signal. The latch 20, in response to the arrival of a latch pulse from the control circuit, temporarily stores the data item read out of the picture memory 24.

The control signal 52 is a latch clear signal for clearing the status of the latch 20 and is applied to the terminal C of the latch. The control signal 54 is applied to the picture memory 24 and is composed of write pulses produced with each output of an A/D conversion pulse in signal 48 at a predetermined phase with respect to the A/D conversion pulses. An item of picture data arriving at the input 22 of the picture memory 24 is written into the memory in response to a write pulse. The location at which the data item is stored is designated by the memory address counter 38. The address designated by the counter 38, namely the value of the count within the counter, is incremented by an address incrementing pulse, namely the control signal 56 delivered by the control circuit 42. Address incrementing pulses 56, like the latching pulses 50, are generated at a predetermined phase with each output of the A/D conversion pulses in signal 48. The counter 38 is cleared by the control signal 58, serving as a reset signal, which arrives from the control circuit 42.

Figure 2:
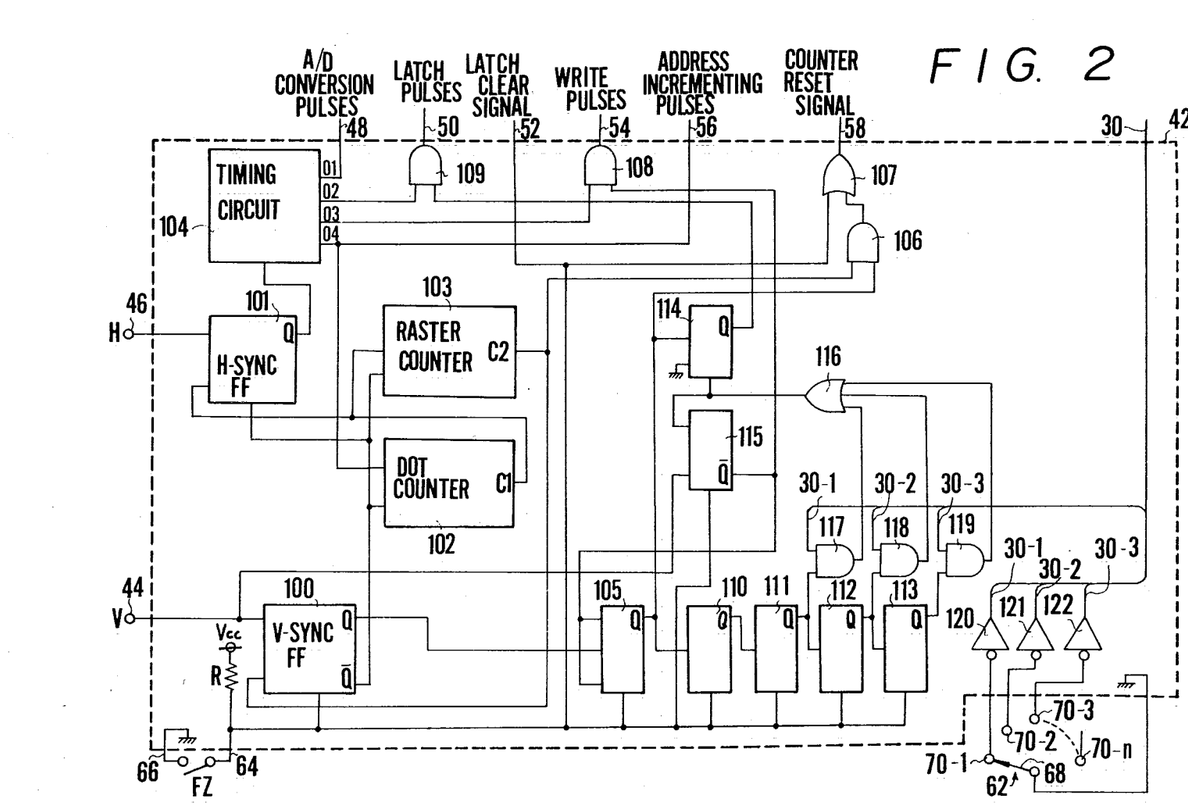
FIG. 2 is a block diagram showing, in some detail, the construction of a control circuit included the arrangement of FIG. 1.

Reference will now be had to FIG. 2 to describe the control circuit 42 in greater detail. In FIG. 2, a line 64 connecting a pull-up resistor R to a freeze switch FZ is held at a high level as long as the freeze switch is open. With line 64 high, various control flip-flops (referred to as FF hereinafter) are reset compulsorily to prohibit the generation of the control signals 48, 50, 54 and 56 but to produce the latch clear signal 52 and address counter reset signal 58. Under these conditions, the freeze control mode of operation is inactive. When the freeze switch FZ is closed, line 64 is connected to ground via the switch contact and a line 66, thereby making it possible to place the control circuit 42 in the operative mode. Under these conditions, the initial arrival of a vertical synchronization signal 1V at the input terminal 44 places a vertical synchronization FF 100 in the set state, this occurring at the leading edge of the signal 1V. As a result, the $\bar{Q}$ output of FF 100 places a horizontal synchronization FF 101, a dot counter 102 and a raster counter 103 in the reset state. Next, with the arrival of the initial horizontal synchronizing signal 1H at input terminal 46, FF 101 reverts to the set state at the leading edge of the signal 1H, whereby the Q output activates a timing circuit 104.

The timing circuit 104 incorporates a reference clock oscillator, not shown, which oscillates constantly at a predetermined frequency, and is adapted to produce, at output terminals O1 through O4, timing signals of mutually differing phases by frequency-dividing the oscillator output. The timing signal produced first is the A/D conversion pulsed signal 48, which appears at output terminal O1. Next, or at the same time, the latch timing signal is produced at output O2, the write timing pulsed signal 54 is produced at output O3 at a timing at least required for the delivery of the adder output 22, which is the sum of the output produced by the A/D converter 12 and the output of the latch 20, and the address incrementing pulsed signal 56 is produced at the output O4 at the end of the write operation. The synchronization of these pulsed signals is constant and set so that a train of 512 pulses is obtained for one horizontal scanning line interval.

The address incrementing pulses obtained at the output O4 of the timing circuit 104 are connected to the clock input terminal of the dot counter 102, which is a nine-bit counter for counting up the 512 picture elements of one horizontal scanning line, each pulse incrementing the counter by one count. Accordingly, when the dot counter 102 counts 512 of the address incrementing pulses, a carry pulse is produced at the output C1 thereof for incrementing the raster counter 103, representing a higher order digit. The horizontal synchronizion FF 101 is reset by the trailing edge of the carry pulse. At this time, the Q output of FF 101 causes the timing circuit 104 to terminate the generation of all signals at its outputs O1 through O4, thereby halting the incrementing of counters 102, 103, the incrementing of the memory address counter 38, and the writing of data into the picture memory 24.

When the second horizontal synchronizing signal 2H arrives, the operations described hereinabove are executed again, the raster counter 103 being incremented before the operating cycle ends. Assuming that two-field interlaced scanning is adopted for each frame, the scanning for one field ends after 114/2=57 scans, so that a six-bit counter will suffice for the raster counter 103. Thus, when the raster counter 103 counts 57 scanning lines, a carry pulse emerges from its output C2, the vertical synchronizion FF 100 being reset at the trailing edge of the carry pulse. Under these conditions, the $\bar{Q}$ output of FF 100 resets FF 101 and counters 102, 103 compulsorily and holds them in this state until the arrival of the second vertical synchronizing signal 2V corresponding to the second field (this is the second field relatively speaking; it need not necessarily coincide with the field on the display screen). At the same time, owing to the end of scanning for the first field, the trailing edge of the Q output of FF 100 sets a divide-by-two frequency dividing FF 105 of J-K type, thereby storing the fact that scanning for the second field is to begin.

When the vertical synchronizing signal 2V of the second field arrives, FF 100 is set so that the raster counter 103 counts 57 scanning lines just as described above. Meanwhile, the memory address counter 38, which is a 16-bit counter that makes it possible to select an address space of 512×114=58368, has already counted up to 512×57=29184 owing to the generation of the address incrementing pulses 56 corresponding to the first field. With the arrival of the next series of address incrementing pulses 56 corresponding to the second field, the memory address counter 38 is advanced another 512×57=29184 counts. At the instant the writing of data into the last used memory address ends, the carry signal is produced at output C2 of the raster counter 103, whereby an AND gate 106, whose other input is the Q output of FF 105, produces a signal which is delivered by an OR gate 107 as the address counter reset signal 58, thereby resetting the address counter 38.

The trailing edge of the Q output of vertical synchronization FF 100 causes the Q output of FF 105 to change state, the trailing edge of this signal incrementing a frame counter comprising J-K type FFs 110 through 113. At the same time, the trailing edge of FF 105 sets a J-K type FF 114, the Q output whereof places logical "1" at one input to an AND gate 109 so that the latching pulses 50 will be delivered by the AND gate from the second frame onward.

When scanning for the second field of the second frame ends, the FF 111 of the frame counter is placed in the set state. It will be seen that a rotary switch 62 has a wiper 68 that is connected to a contact 70-1. This indicates that an accumulation operation is to be performed for two frames. An inverter 120, whose input is connected to the contact 70-1, produces an output 30-1 which places logical "1" at one input to an AND gate 117. Accordingly, the Q output of FF 111 at the other input to the AND gate 117 causes the AND gate to produce an output that is delivered by an OR gate 116. The output signal resets the FF 114 compulsorily and holds the data input terminal of a D-type FF 115 high. At this instant, FF 114 forbids any further delivery of the latching pulses 50. Then, when the initial vertical synchronizing signal 5V of the third frame eventually arrives, FF 115 is set so that its $\bar{Q}$ output places logical "0" at one input to AND gate 108, prohibiting the delivery of any further write pulses 54. Thus, two frames of picture data are accumulated and stored in the picture memory 4. With the end of this control operation, the read cycle for the frozen picture data begins with the third frame onward. The control circuit 42, in order to hold this state, is arranged so that the $\bar{Q}$ output of FF 115 places logical "0" at the J-K input terminal of the divide-by-two FF 105, thereby halting the incrementing of the frame counter. When it is desired to end the cycle for reading out the frozen picture data, the freeze switch FZ is opened to restore the control circuit 41 to the initial state.

It should be noted that the memory address counter 38 can be dispensed with if the control circuit 42 is so arranged that the outputs of the dot counter 102, raster counter 103 and divide-by-two FF 105 are employed directly as address signals for the picture memory 24.

Thus, the control circuit 42 generates the above-described control signals at various timings in synchronism with the vertical and horizontal synchronizing signals applied to the respective input terminals 44, 46 of the control circuit. As mentioned above, these control operations may be carried out externally using the freeze switch FZ, which may be a key or like switch, and the rotary swtich 62. The freeze switch FZ is connected to the control circuit 42 by the lines 64, 66 and, when closed, sets the control circuit 42 into operation to start the picture freeze mode. The rotary switch 62, in addition to the contact 70-1 mentioned eariler, also has contacts 70-2, 70-3, ..., 70-n which, by being contacted with the wiper 68, enable consecutive selection of the number of frames used in a frozen picture.

In order to enhance the picture quality, i.e., to improve upon the signal-to-noise (S/N) ratio, of the displayed frozen picture obtained by freezing the dynamic image at a certain instant in time, a feature of the present invention is that, following the freeze instruction, the mean value is taken of the picture signals of corresponding picture elements in each frame of the number of frames designated, and that the frozen picture is formed based on the mean value. The switch for initiating the freeze mode of operation manually is the freeze switch FZ, while the switch for setting the number of frames used in the mean value calculation is the rotary switch 62. The latter is capable of selecting alternatively from among numbers of frames 2, 4, 8, ..., $2^n$.

Figure 4A:
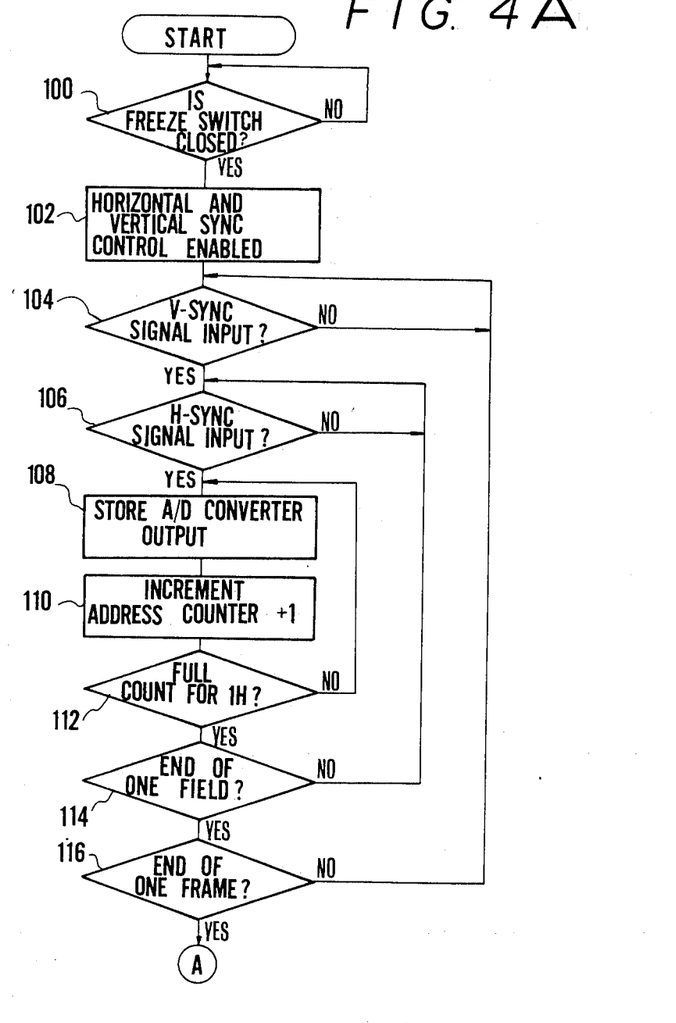
FIGS. 4A and 4B illustrate a flowchart useful in describing the operation of the control circuit shown FIG. 2.
Figure 4B:
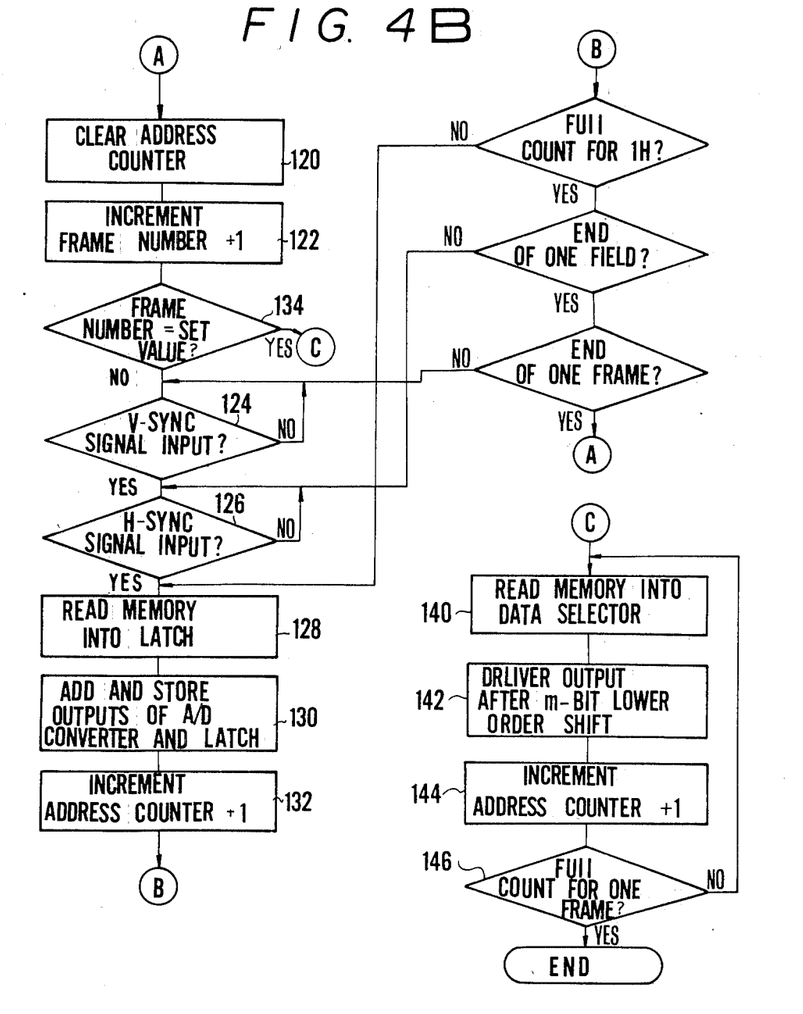

A detailed description of the freeze mode of operation performed by the apparatus of FIG. 1 will now be had with reference to the flowchart shown in FIGS. 4A and 4B.

First, the freeze switch FZ is closed. When this is sensed within the control circuit 42 (Step 100), an internal control flip-flop is released from the reset state to make possible the start of control in synchronism with the externally applied horizontal and vertical synchronization signals (Step 102). In the illustrated embodiment, it is assumed that one frame-two field interlaced scanning is adopted at a rate of 30 frames per second, as mentioned earlier. When a vertical synchronizing signal corresponding to the first field (relatively speaking) of the initial frame arrives at input terminal 44 (Step 104) followed by the arrival at input terminal 46 of a horizontal synchronizing signal corresponding to the initial horizontal scanning line (1H) (Step 106), the control circuit 42 produces 512 of the A/D conversion pulses 48 successively as described above. In response to these pulses, the A/D converter 12 successively converts the picture signal at its input terminal 10 into an N-bit digital signal, at output 14, which corresponds to the level of the picture signal. At this time the latch 20 has not yet received the latching pulses 50 from the control circuit 42, so that the other input 18 to adder 16 is null. In consequence, the output 22 of adder 16 is the item of picture data received intact from the A/D converter 12.

Meanwhile, the write control input to picture memory 24 is supplied with the write pulses 54 from the control circuit 42. These pulses are generated at a predetermined phase relative to the A/D conversion pulses 48. The storage locations for the picture data entering the memory 24 are designated by the memory address counter 38 via line 40. The counter 38 is incremented by the incrementing pulses 56 supplied by the control circuit 42. These pulses also are supplied at a predetermined phase relative to the A/D conversion pulses 48. Hence, in response to the write pulses 54, the items of picture data delivered by the adder 16 at output 22 are stored successively, for each picture element, at the storage locations designated by the memory address counter 38. By way of example, the item of data for the initial picture element of the initial horizontal scanning line is stored at address 0 of the memory 24 (Step 108), counter 38 is then incremented, i.e, advanced one count (Step 110), followed by storage, at address 1, of the item of data for the next picture element. This process is repeated for the entirety of the initial scanning line (1H) to complete the storage of the corresponding data in memory 24 (Step 112).

With the arrival of the next horizontal synchronizing signal at input terminal 46 (Step 106), the foregoing process is repeated for the second through 57th horizontal scanning lines. When this has been achieved, items of picture data relating to the picture elements of one field will have been stored at the storage locations, corresponding to these picture elements, of the memory 24 (Step 114).

The above-described operations are repeated for the second field of the initial frame. Doing so completes the storage of the picture data for all picture elements of one frame (Step 116).

Upon storage of one frame of picture data, the control circuit 42 issues the counter reset signal 58 to clear the address counter 38 (Step 120 in FIG. 4B) and increments the counter (FIG. 2) for counting the number of frames (Step 122).

The control circuit 42 executes the foregoing process in similar fashion with regard to the second frame in response to the next arriving vertical and horizontal synchronizing signals (Steps 124, 126). For frames on and after the second frame, however, processing changes somewhat in the following manner. Specifically, in the operations for the second frame onward, the control circuit 42 supplies the latch 20 with the latching pulses 50 in synchronism with the A/D conversion pulses 48, whereby the latch 20 temporarily stores the picture data read out of the picture memory 26 from the addresses designated by the memory address counter 38 (Step 128). The picture data temporarily stored in the latch 20 is applied to input 18 of the adder 16, at which time the data is added to picture data arriving at the other input 14 from the A/D converter 12. The resulting sum appears at output 22. As in the case of the first frame, the above sum is stored in the picture memory 24 at the address being designated at that time by the address counter 38, namely at the address corresponding to the picture element of the picture data read out by latch 20 (Step 130).

The foregoing will be understood more clearly by way of the following example. Assume that the A/D converter 12 provides the input 14 of the adder 16 with the item of picture data corresponding to the initial picture element of the initial horizontal scanning line in the first field of the second frame. Because the address counter 38 is designating the address 0 of memory 24 at this time, the latch 20, when activated by a latching pulse 50, reads in the item of picture data from the address 0. This item of picture data is a data item relating to the corresponding picture element in the initial frame, mentioned above. The item of picture data latched by latch 20 is applied to input terminal 18 of the adder 16 for being added to the item of picture data at input 14, the sum appearing at output 22. Since the counter 38 is still designating the address 0 at this time, the sum is stored in the same address, namely address 0, in response to a write pulse 54. The sum naturally is written over the preceding item of picture data stored at address 0 so that this previous data vanishes. Subsequently, as the address counter 38 is incremented (Step 132), the foregoing process is executed for the next picture element in the same horizontal scanning line so that the item of picture data stored at address 1 of memory 24 is added to the item of picture data of the second picture element arriving at input terminal 10, the sum being stored at address 1. Thenceforth, these operations are repeated successively for each frame. Then, when the number of frames subjected to these addition and storage operations coincides with the number $2^m$ set by rotary switch 62, the control circuit shifts next to the frozen display mode of operation (Step 134).

Under the foregoing conditions, what is stored at each storage location of the picture memory 24 in the freeze mode of operation is an item of "accumulated" data obtained by adding corresponding items of picture data relating to corresponding picture elements in each frame, the addition being performed for a series of frames, of the set number, starting at the instant the freeze mode is designated.

In the frozen display mode of operation, the control circuit 42 produces the counter reset signal 58 to reset the memory address counter 38, and supplies the counter sucessively with address incrementing pulses 56. Since the write pulses 54 are not provided in this mode, the picture memory 24 is placed instead in a read mode of operation. Thus, picture data, namely the aforementioned accumulated picture data, is read out of the picture memory 24 from the address designated by the address counter 38 (Step 140). The data selector 28, in response to the control signal 30 from the control circuit 42, shifts the accumulated data at output 26 toward lower order digits (i.e., to the right) by m bits (Step 142). In other words, the data selector 28 produces, at output 32, higher order N-bit data starting from a position obtained by shifting the least significant bit position of the accumulated data toward the left, or higher order digits, by m bits. Accordingly, the picture data at output 32 is data obtained, in effect, by dividing the accumulated data by $2^m$.

Figure 3:
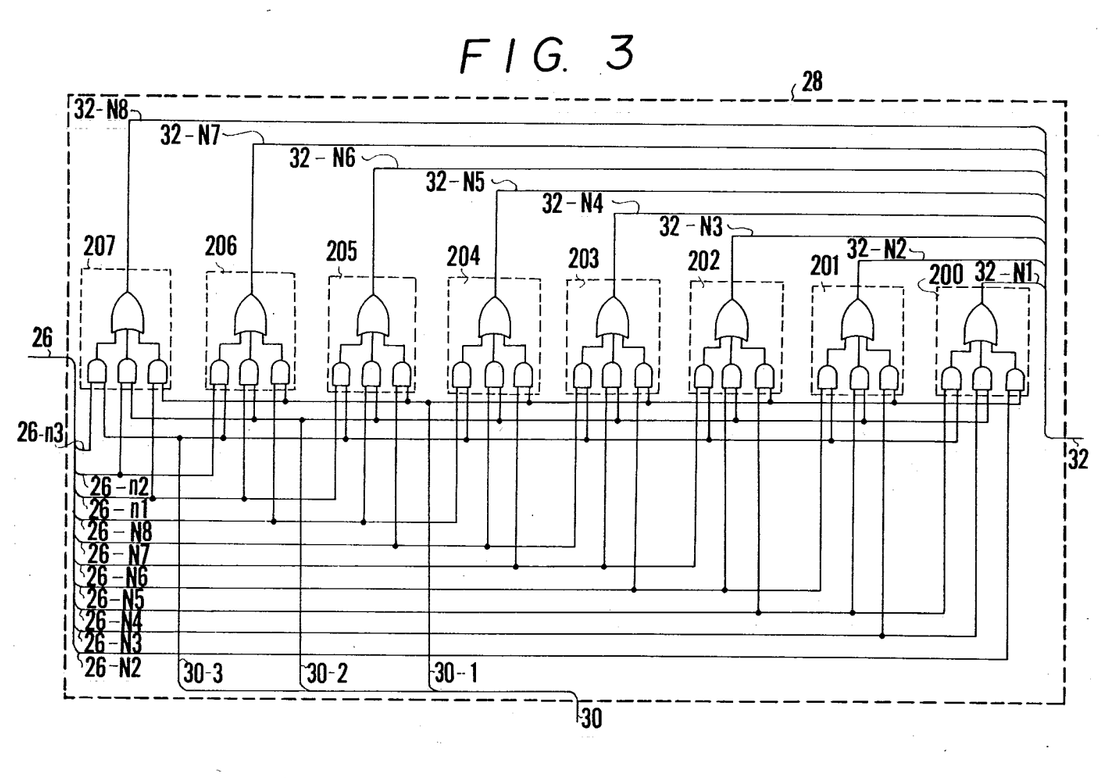
FIG. 3 is a circuit diagram showing the construction of a data selector included in the arrangement of FIG. 1.

FIG. 3 shows an exemplary circuit arrangement of the data selector 28 for a case where eight (8) is taken as the number of bits N constituting an item of picture data, and where 2, 4 and 8 are capable of being selected as the number of frames whose data may be added. Since the maximum number of frames which can be added in this case is $2^3$, the storage capacity of the picture memory 24 per picture element need be 8+3 bits. In ascending order, starting from the least significant bit, these bits are represented by signals 26-N1 through 26-N8 and signals 26-n1 through 26-n3, respectively. Since the minimum number of frames which can be added is $2^1$, however, the least significant bit signal 26-N1 is deleted. When operation shifts to the frozen display operating mode, one of the signals 30-1, 30-2, 30-3 from control circuit 42 is raised to the high level in accordance with the setting of the rotary switch 62. Signal 30-1 indicates accumulation of two frames, 30-2 accumulation of four frames, and 30-3 accumulation of eight frames. Also, whichever of these signals is applied simultaneously controls the division, within the data selector 28, of the accumulated picture data appearing at output 26, dividing the picture data by 2, 4 or 8, respectively.

The data selector 28 comprises eight AND-OR circuits 200 through 207. The abovementioned division based on $2^m$ is carried out by constantly delivering, at output 32, the eight-bit data starting from the least significant digit which remains after the accumulated item of picture data made up of bits 26-N2 through 26-n3, namely the dividend, is shifted out to the left by m bits. These bit signals which appear at output 32 are denoted 32-N1 through 32-N8 in ascending order starting from the least significant bit.

The D/A converter 34 converts the result of the division operation, namely the quotient, into the corresponding analog signal to produce a serial picture signal at its output terminal 36.

When an item of picture data for one picture element is read out of the memory 24, the control circuit 42 increments the address counter 38 (Step 144), whereby the next item of picture data for the next picture element is read out by repeating the above-described operations. When the foregoing process has been carried out for the picture elements of one frame (Step 146), one frame of a serial picture signal will have been formed at the picture signal output terminal 36 of the D/A converter.

It will be understood from the foregoing that the picture signal which appears at terminal 36 following closure of the freeze switch FZ represents a picture obtained by accumulating items of picture data of corresponding picture elements for a series of $2^m$ frames, followed by dividing the accumulated data by $2^m$. In other words, the picture signal at terminal 36 represents the arithmetic mean of the items of picture data of corresponding picture elements for the series of $2^m$ frames. Theoretically, therefore, a picture signal the S/N ratio whereof is improved $\sqrt{2^m}$ times is is obtained at output terminal 36. Displaying a static picture formed by this signal provides excellent picture quality not heretofore obtainable.

Because N bits are obtained at the output of the A/D converter 12 following conversion, while the maximum number of accumulation operations for each picture element, namely the number of accumulated frames, is $2^n$, it will suffice if the picture memory 24 has a storage capacity of N+n bits per picture element. It is therefore unnecessary to provide $2^n$ picture memories of an N-bit storage capacity per picture element, as in the prior art.

It should be noted that the data selector 28 need not necessarily be provided. For example, in a case where the apparatus does not include the rotary switch 62 and the number of frames used in the freeze mode is fixed at a predetermined value, an arrangement may be adopted wherein the picture signal read out of the picture memory 24 is applied directly to the D/A converter 34 as the input signal thereto, with the converter 34 producing, at output terminal 36, an analog picture signal at an appropriate level, or gain, set in the converter 34. If the number of frames used in producing the frozen picture is variable, then an arrangement may be employed wherein the gain at the output stage of the D/A converter 34 can be varied in accordance with the number of frames used.

A display device 51, such as a cathode-ray tube (CRT) for presenting the frozen picture as a soft copy, may be connected to the output terminal 36 at which the picture signal appears. In such case, a separate refresh memory may be provided, though it is also possible to use the picture memory 24 for this purpose. By way of example, the picture data may be read out of the picture memory 24 repeatedly at a rate of 30 frames per second. It is also possible, by providing a $2^o$-dividing circuit, to readily realize an arrangement wherein the picture memory can be used as a refresh memory when displaying a dynamic picture.

The ultrasonic diagnostic apparatus of the present invention, constructed and operating as described above, has a number of features and effects which will now be set forth.

The apparatus of the invention may be used effectively in many applications owing to the improved static picture quality. Since freezing a picture with the technique of the invention improves picture quality by taking the mean value of a plurality of frames, a vast improvement may be discerned in the frozen image of a comparatively slow-moving picture, such as in the frozen picture of the human abdomen or in frozen pictures relating to obstetrics and gynecology. Furthermore, in accumulating the picture data during the freeze mode of operation, new picture data is added to previous picture data read out of the picture memory, for each and every picture element, and the resulting sum is written back into the picture memory. Since this operating process is performed on a one-at-a-time basis (i.e., frame-by-frame) serially in time, the picture memory need only have enough storage capacity for one frame of picture data. It is thus possible to realize an ultrasonic diagnostic apparatus with a picture memory smaller than that employed in the prior art, thereby lowering the cost of the apparatus.

As many apparently widely different embodiments of the present invention can be made without departing from the spirit and scope thereof, it is to be understood that the invention is not limited to the specific embodiments thereof except as defined in the appended claims.

What I claim is:

1. An image processor for use with ultrasonic diagnostic apparatus for displaying a frozen image based on an initial serial picture signal. which signal includes items of picture element data comprised of bits representing each of a plurality of picture elements contained in one frame, comprising:

memory means for storing each item of picture element data of one frame at a storage location corresponding to each picture element;

adding means coupled to said memory means for adding all bits of each item of picture element data, each time the item of picture element data of one frame arrives at an input of said adding means, to all bits of an item of picture element data stored at a storage location in said memory means which location corresponds to said arrived item of picture element data;

control means for causing the addition of picture element data, performed by said adding means, to be executed for a selected number of a series of frames; and read means coupled to said memory means for reading the items of picture element data, stored in said memory means, out of said memory means successively only when the addition of picture element data as performed by said adding means ends for said selected number of a series of frames, said items of picture element data being converted into a final serial picture signal for displaying a frozen image;

wherein said read means includes dividing means for producing the final serial picture signal by dividing each item of picture element data read out of said memory means by said selected number, said dividing operation being performed once only after all bits of all the items of picture element data corresponding to each said storage location are added to one another for said selected number of a series of frames, so that the signal-to-noise ratio of said final picture signal is greater by a factor of the square root of said selected number with respect to said initial picture signal.

2. An image processor for use with ultrasonic diagnostic apparatus according to claim 1, in which said control means includes means for setting said selected number manually.

3. An image processor for use with ultrasonic diagnostic apparatus according to claim 1, in which said adding means includes data holding means for reading out of said memory means, and for temporarily holding, an item of picture element data stored at a storage location corresponding to said arrived item of picture element data at the input of said adding means, the item of picture element data held in said holding means being added to said arrived item of picture element data by said adding means, wherein said control means causes the result of the addition to be stored in said memory means at the corresponding storage location.

4. An image processor for use with ultrasonic diagnostic apparatus according to claim 3, in which said control means includes means for setting said selected number manually.

* * * * *